US010377897B2

(12) United States Patent
Perez Graterol et al.

(10) Patent No.: US 10,377,897 B2
(45) Date of Patent: Aug. 13, 2019

(54) LASER-MARKABLE POLYAMIDE COMPOSITION

(71) Applicant: DSM IP ASSETS B.V., Heerlen (NL)

(72) Inventors: Raul Marcelino Perez Graterol, Echt (NL); Franciscus Gerardus Henricus Van Duijnhoven, Echt (NL); Franciscus Wilhelmus Maria Gelissen, Echt (NL); Johannes Hoekstra, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 96 days.

(21) Appl. No.: 15/311,346

(22) PCT Filed: May 18, 2015

(86) PCT No.: PCT/EP2015/060894
§ 371 (c)(1),
(2) Date: Nov. 15, 2016

(87) PCT Pub. No.: WO2015/177092
PCT Pub. Date: Nov. 26, 2015

(65) Prior Publication Data
US 2017/0081513 A1 Mar. 23, 2017

(30) Foreign Application Priority Data
May 20, 2014 (EP) .................... 14169033

(51) Int. Cl.
| C08L 77/00 | (2006.01) |
| C08L 77/02 | (2006.01) |
| B41M 5/26 | (2006.01) |
| C08J 3/22 | (2006.01) |
| C08J 3/20 | (2006.01) |
| C08K 3/22 | (2006.01) |
| C08K 5/098 | (2006.01) |
| C08K 5/3492 | (2006.01) |
| C08K 7/14 | (2006.01) |
| C08L 77/06 | (2006.01) |

(52) U.S. Cl.
CPC ............ *C08L 77/02* (2013.01); *B41M 5/267* (2013.01); *C08J 3/203* (2013.01); *C08J 3/22* (2013.01); *C08K 3/2279* (2013.01); *C08K 5/098* (2013.01); *C08K 5/34924* (2013.01); *C08K 7/14* (2013.01); *C08L 77/06* (2013.01); *C08J 2377/02* (2013.01); *C08L 2201/02* (2013.01); *C08L 2205/025* (2013.01)

(58) Field of Classification Search
CPC ....... C08L 77/02; C08K 3/2279; C08K 5/098; C08J 3/22; C08J 3/203
USPC ....................................... 523/351
See application file for complete search history.

(56) References Cited

U.S. PATENT DOCUMENTS

| 4,194,072 | A | | 3/1980 | Chang et al. | |
| 6,028,134 | A | * | 2/2000 | Zhang | .................... C08K 3/22 522/2 |
| 6,369,137 | B2 | * | 4/2002 | Kersjes | ................ C07D 251/54 524/100 |
| 6,951,896 | B2 | * | 10/2005 | Ottenheijm | ............. C08L 67/02 524/100 |
| 7,452,934 | B2 | * | 11/2008 | Ottenheijm | .......... C08K 3/2279 524/409 |
| 7,803,856 | B2 | * | 9/2010 | Perego | ................. C08K 5/5313 524/100 |
| 9,050,843 | B2 | * | 6/2015 | Duijnhoven Van | ...... B01J 13/04 |
| 9,150,702 | B2 | * | 10/2015 | Gelissen | .................. C08K 3/22 |
| 2012/0276390 | A1 | * | 11/2012 | Ji | .......................... H05K 3/185 428/412 |

FOREIGN PATENT DOCUMENTS

| EP | 1 170 335 | 1/2002 |
| JP | 11-241019 | 9/1999 |
| WO | WO 01/21711 | 3/2001 |
| WO | WO 2004/111127 | 12/2004 |
| WO | WO 2009/003976 | 1/2009 |

OTHER PUBLICATIONS

Woodford, Chris, "Relays," Available online <https://www.explainthatstuff.com/howrelayswork.html> Apr. 20, 2018. (Year: 2018).*
International Search Report and Written Opinion of the ISA for PCT/EP2015/060894, dated Aug. 14, 2015, 12 pages.
Berger, "Flammschutzmittel", *RÖMPP*, Apr. 2009, pp. 1-6.
Kohan, "Nylon Plastics Handbook, Laser-Additive," Hanser/Bardner Publications, Inc., p. 39 (2008).
Meixner, Marco, "*Laser Additives: A New Generation of NIR Absorbers*", Kunstoffe Aug. 2008; https://www.kunstoffe.de/en/journal/archive/article/laser-additives-a-new-generation-of-nir-absorbers-593141.html?search.highlight=PE104311.

* cited by examiner

*Primary Examiner* — Hannah J Pak
(74) *Attorney, Agent, or Firm* — Nixon & Vanderhye P.C.

(57) ABSTRACT

The invention relates to a laser-markable polyamide composition comprising: a first phase comprising $Sb_2O_3$ and an aliphatic polyamide with an amide density AD1, and a second phase comprising an aliphatic polyamide with an amide density AD2, wherein AD1-AD2 is at least 0.01, and wherein the amount of $Sb_2O_3$ is between 0.1 and 5 wt %, a halogen-free flame retardant in an amount of between 1 to 25 wt %, wherein the amount in weight percentage are based on the total amount of composition. The invention also relates to a process for preparing a laser-markable polyamide composition, as well as laser-marked products comprising the composition.

12 Claims, No Drawings

LASER-MARKABLE POLYAMIDE COMPOSITION

This application is the U.S. national phase of International Application No. PCT/EP2015/060894 filed May 18, 2015, which designated the U.S. and claims priority to EP Patent Application No. 14169033.9 filed 20 May 2014, the entire contents of each of which are hereby incorporated by reference.

This invention relates to laser-markable polyamide compositions comprising $Sb_2O_3$ (hereafter also referred to as antimony trioxide), and a halogen-free flame retardant, as well as articles made from these compositions. The invention also relates to a process for preparing these compositions, as well as a composition obtainable as intermediate of this process. The invention further relates to laser-marked products comprising the composition.

Laser-markable polyamide compositions comprising antimony trioxide are known and for example described in WO01/00719.

A drawback of these kind of compositions is that they show insufficient laser markability, which makes it necessary to use higher amounts of antimony trioxide, or alternatively, to use a synergist to enhance laser markability. It is important to have compositions with good laser markability in combination with lower amounts of antimony trioxide, as antimony is known to be toxic.

It is thus an object of the present invention to have laser-markable polyamide compositions, which show a better laser markability, or, show good laser markability with a lower amount of antimony trioxide. This object has been met by a laser-markable polyamide composition comprising:

a first phase comprising $Sb_2O_3$ and an aliphatic polyamide with an amide density AD1, and a second phase comprising an aliphatic polyamide with an amide density AD2, wherein AD1-AD2 is at least 0.01, and wherein the amount of $Sb_2O_3$ is between 0.1 and 5 wt %, a halogen-free flame retardant in an amount of between 1 to 25 wt %, wherein the amount in weight percentage is based on the total amount of composition.

Surprisingly, the laser-markable polyamide composition according to the present invention shows enhanced laser markability when employing the same amount of antimony trioxide. This has been exemplified by examples.

The laser-markable polyamide composition also shows sufficient laser markability when the amount of antimony trioxide is lowered. Surprisingly, the inventors have found that reduction of antimony trioxide by 50% with a laser-markable polyamide composition according to the invention, shows similar laser-marking result. This allows for a significant reduction of antimony trioxide in laser-markable polyamide compositions, which is beneficial from both health perspective as well as cost perspective.

Surprisingly, the laser-markable polyamide composition also exhibits good Comparative Tracking Index (CTI). This property is important for applications in many fields, such as the field of electronics, as it measures the electrical breakdown properties, also known as tracking, of the material. CTI is usually denoted by a number, optionally followed by a number between brackets. The first number denotes the voltage at which the material with a thickness of 3 mm can withstand 50 drops of ammonium chloride solution. The second number between brackets shows which voltage was obtained while withstanding 100 drops. All reported CTI values are measured in accordance with IEC 60112 with solution A.

The laser-markable polyamide composition according to the invention exhibits CTI values in the order of 400 V. Preferably the CTI is at least 600 V.

Preferably the laser-markable polyamide composition comprises:

a first phase comprising $Sb_2O_3$ and polyamide 46, and a second phase comprising polyamide 66 or polyamide 6, wherein the amount of $Sb_2O_3$ is between 0.1 and 5 wt % and the composition further comprises melamine cyanurate in an amount of between 4 and 25 wt % and glass fibers in an amount of between 5 and 40 wt %, all amounts based on the total amount of composition.

Aliphatic Polyamide

An aliphatic polyamide is herein understood to be a polyamide essentially built from aliphatic monomeric units, including copolyamides and (co)polyamide blends. Aliphatic monomeric units include aliphatic diamines, denoted as AA, and aliphatic diacids, denoted as BB, for which the polyamide is denoted as AABB type. Aliphatic monomeric units also include aliphatic aminoacids, denoted as AB, for which the polyamide is denoted as AB type.

Aliphatic diamines include for example 1,4-diaminobutane, 1,5-diaminopentane, 1,6-diaminohexane. Aliphatic diacids include for example 1,6-hexanedioic acid, 1,8-octanedioic acid, 1,9-nonanedioic acid, 1,11-decanedioic acid, undecandioic acid, 1,12-dodecanedioic acid, 1,13-tridecanedioic acid, 1,14-tetradecanedioic acid, 1,15-heptadecanedioic acid, 1,16-hexadecanedioic acid, 1,17-septadecanedioic acid and 1,18-octadecandioic acid.

Aliphatic aminoacids include for example epsilon-caprolactam, aminodecanoic acid, aminoundecanoic acid and aminododecanoic acid.

"Essentially built from aliphatic monomeric units" is hereby understood to include aliphatic polyamide comprising at most 10 wt % of non-aliphatic units, more preferably at most 5 wt % of non-aliphatic units. Non-aliphatic units include for example terephtalic acid, isophtalic acid, isophorone diamine.

"Amide density" is a property of a polyamide that is defined as the ratio of the number of CONH groups per $CH_2$ groups in the polymer repeat unit.

For example, the amide density for aliphatic polyamides of the AB type can be calculated according to:

Amide density (AB type)=$1/(X-1)$; where X is the number of CH2 groups in a monomeric building block;

The amide density for aliphatic polyamides of the AABB type can be calculated according to:

Amide density (AABB type)=$2/(Y+Z-2)$; where Y is the number of CH2 groups in a diamine and Z is the number CH2 groups in a diacid.

The amide density of several well-known polyamides is listed in the table below.

TABLE 1

Amide density

| Polyamide | Monomeric building block(s) | Amide density |
| --- | --- | --- |
| PA-6 | caprolactam | 0.20 |
| PA-66 | Hexamethylene diamine, adipic acid | 0.20 |
| PA-610 | Hexamethylene diamine, sebacic acid | 0.14 |
| PA-410 | Diaminobutane, sebacic acid | 0.17 |
| PA-46 | Diaminobutane, adipic acid | 0.25 |

The laser-markable polyamide composition according to the invention comprises a first phase comprising $Sb_2O_3$ and an aliphatic polyamide with an amide density AD1, and a second phase comprising an aliphatic polyamide with an amide density AD2, wherein AD1-AD2 is at least 0.01, and wherein the amounts in weight percentage are based on the total amount of composition. Preferably AD1-AD2 is at least 0.02, more preferably AD1-AD2 is at least 0.03 and most preferred AD1-AD2 is at least 0.04. The higher the difference in amide density between the two phases, thus the higher the value for AD1-AD2, the better the affinity is for antimony trioxide for the polyamide with the higher amide density, as compared to the polyamide with the lower amide density, which results in better laser markability. AD1-AD2 may be as high as 0.1. Preferably, the polyamide in the first phase is PA-46 and in the polyamide in the second phase is PA-6 or PA-66. The most preferred embodiment is that the polyamide in the first phase is PA-46 and in the second phase PA-6, as PA-6 is readily available.

Antimony Trioxide $Sb_2O_3$ is known as a laser-marking additive. In view of this invention, also components based on $Sb_2O_3$ and minor amounts of other components are included under the term $Sb_2O_3$. In view of obtaining good contrast the average particle size of the antimony trioxide is preferably at least 1, more preferably at least 1.5, even more preferably at least 2 and most preferably at least 3 micrometer. With average particle size is meant the number average particle diameter D50 as can be determined with a dynamic light scattering particle analyzer. Although the contrast can be further improved at higher diameters, the particle size is, in view of the retention of mechanical properties, preferably below 10, more preferably below 8 and most preferably below 5 micrometer. In a preferred embodiment of the composition according to the invention the antimony trioxide has a particle size between 1 and 8 micrometer, more preferably between 2 and 5 micrometer.

The amount of antimony trioxide in the laser-markable polyamide composition according to the invention is preferably at least 0.5 weight percent, more preferably at least 1 weight percent, and even more preferably at least 1.2 weight percent and most preferably at least 1.5 weight percent, with respect to the total amount of composition. The advantage of this is an increasing improvement of the contrast. At higher contents up to for example 15 weight percent the contrast may further marginally improve. Preferably, however, the amount of antimony trioxide is lower than 5 weight percent, more preferably lower than 4 weight percent, and most preferably lower than 3 weight percent as this results in better mechanical properties and electrical properties of the polyamide composition, while the contrast obtained upon laser-marking is not substantially less. Preferably, the polyamide composition therefore contains between 0.1 and 4 weight percent, more preferably between 0.5 and 3 weight percent and most preferably between 1 and 2 weight percent antimony trioxide with respect to the total amount of composition.

In particular when antimony trioxide is the only laser-marking additive the amount of antimony trioxide is, in view of obtaining good contrast, preferably between 2 and 5 weight percent. Further, in that case, the average particle size is, preferably also chosen somewhat higher, preferably at least 1.5, more preferably at least 2 and most preferably at least 3 micrometer.

Synergist

Optionally, the polyamide composition according to the invention comprises a laser-marking synergist next to the antimony trioxide. Synergists are known in the prior art and include for example nacreous pigments, metal oxides or alloys of metal oxides such as antimony tin oxide. Nacreous pigment contains plate-shaped particles with a high refractive index of e.g. a silicate preferably covered with metal oxide. A definition of nacreous pigment is given for instance in the "Encyclopedia of Chemical Technology Kirk-Othmer", third edition (1982), Vol. 17, p. 833. Examples of nacreous pigments that can be used in the polyamide composition according to the invention are described in EP-B-0797511, paragraph 0016, 0017 and 0018.

With laser-marking additive in this invention is meant the total amount of antimony trioxide and laser-marking synergist.

It was found that when such synergists are present in an amount of at least 1 weight percent compared to the total amount of laser-marking additive an improvement in laser-marking performance is obtained. Although adding higher amounts of synergist will generally result in better marking performance it is for economic reasons desirable to limit the amount of synergist used in the total formulations. Preferably between 1 and 50 weight % of the laser-marking additive is present as synergist, more preferably between 3 and 20 percent and most preferably between 5 and 10 percent, weight percentages relative to the total amount of laser-marking additive.

Preferably the amount of synergist is between 0.025 and 0.5 wt % based on the total amount of composition.

Other Ingredients

The laser-markable polyamide composition according to the invention may also comprise other ingredients, such as fillers, flame retardants, mold release agents, branching agents, lubricants and pigments. Fillers includes fibers, such as for example glass fibers and carbon fibers. In a preferred embodiment, the laser-markable polyamide composition comprises glass fibers in the range of 10 and 45 wt % with respect to the total composition, more preferably in the range of 15 to 35 wt % and most preferred in the range of 20 to 30 wt %, as this enhances the mechanical performance.

Flame Retardants

The laser-markable polyamide composition according to the invention comprises a halogen-free flame retardant, such as for example triazine-type flame retardant, such as melamine, melamine cyanurate, melam, melem, ammeline, ammelide, as well as mixtures thereof.

The flame-retardant is halogen-free, as this facilitates recycling and is less hazardous for the environment and results in a better CTI performance. The amount of halogen-free flame retardant is preferably between 4 and 25 wt %, based on the total amount of composition. The presence of a halogen-free flame retardant has as advantage that the polyamide composition according to the invention can also be applied in applications in which flame retardancy is required such as for example in components for electrical and electronic applications. Electrical and electronic applications include for example systems for power transfer as well as data transfer via electrical circuitry and electronic components, such as electronic communication systems, computers, cell phones, auto-electronics, lighting, white goods, etc. Electronic components can be for example connectors, bobbins, relays, inductors, din rails, enclosures.

Other suitable halogen-free flame-retardants are for example phosphorus compounds, such as organic phosphates, phosphites, phosphonates and phosphinates, as well as $Mg(OH)_2$. Preferably use is made of phosphinates.

Examples of such compounds are described in for example Kirk Othmer, Encyclopedia of chemical technology, Vol. 10, p. 396 ff. (1980).

Preferably, a dialkylphosphinic salt of the formula (I) and/or of a diphosphinic salt of the formula (II) and/or polymers thereof is present in the composition according to the invention;

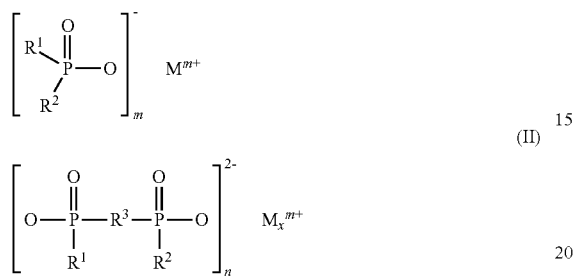

in which
R1, R2 are the same or different and are each linear or branched C1-C6-alkyl;
R3 is linear or branched C1-C10-alkylene, C6-C10-arylene, C7-C20-alkylarylene or C7-C20-arylalkylene;
M is Mg, Ca, Al, Sb, Sn, Ge, Ti, Zn, Fe, Zr, Ce, Bi, Sr, Mn, Li, Na, K and/or a protonated nitrogen base;
m is 1 to 4;
n is 1 to 4;
x is 1 to 4.

Optionally, if a dialkylphosphinic salt of the formula (I) and/or of a diphosphinic salt of the formula (II) and/or polymers thereof is present, the composition according to the invention may also comprise a salt of phosphorous acid having the formula (III)

in which
M is Mg, Ca, Al, Sb, Sn, Ge, Ti, Zn, Fe, Zr, Ce, Bi, Sr, Mn, Li, Na and/or K;
m is 1 to 4.

Flame-retardants according to the formula's (I) to (III) above are described in US2013190432.

It is particularly advantageous to use an organic phosphorus compound with a phosphorus content of at least 14 wt. %; preferably 18 wt. %. An example of this are Amgard P45, and the pure or mixed metal phosphinates (trade name Exolit OP1230 or OP1311, OP1400 and OP1312 by Clariant) as for instance in U.S. Pat. Nos. 4,208,321 and 3,594,347, as well as melamine polyphosphate. The concentration of organic phosphorus compound which may be optionally present, may vary within a wide range, for example between 0.5 and 20 wt. %, preferably between 1 and 12 wt. %, even more preferably between 2 and 10 wt. %.

Most preferred is a halogen-free flame-retardant composition which comprises between 4 to 25 wt % melamine cyanurate.

The inventors have found that a laser-markable polyamide composition according to the invention comprising a flame retardant shows good laser markability, together with good flame retardancy and high CTI. This is surprising, as these properties usually cannot be sufficient in one composition. Preferably, the laser-markable polyamide composition is free of polyethylene, as this influences the flame-retardancy. Process The invention also relates to a process for preparing a laser-markable polyamide composition as described above.

The process for preparing the laser-markable composition comprises the following steps:
a) blending $Sb_2O_3$ in an amount of between 7.5 to 85 wt % with respect to the total amount of masterbatch and an aliphatic polyamide with an amide density AD1 at a temperature above the melting temperature of the aliphatic polyamide with an amide density AD1 into a masterbatch,
b) producing a laser-markable polyamide composition by blending the masterbatch in an aliphatic polyamide with an amide density AD2 at a temperature above the melting temperature of the aliphatic polyamide with an amide density AD1,
wherein AD1-AD2 is at least 0.01 and wherein the amount of $Sb_2O_3$ is between 0.1 and 5 wt %, based on the total amount of laser-markable polyamide composition and wherein in step a) or b) a halogen-free flame retardant is added.

When in step a) and/or b) blends of polyamides are employed, AD1 and AD2 is based on the majority component of the blend.

This process provides good laser-marking contrast, compared to a process in which the antimony trioxide is directly added to a composition.

Optionally, a laser-marking synergist for the antimony trioxide is added. Preferably the synergist is added during step a).

In the present invention the masterbatch comprises 7.5 to 85 wt % of antimony trioxide and optionally a laser-marking synergist with respect to the total amount of masterbatch. Preferably, the amount is between 5 to 80 wt %, and more preferably between 50 and 80 wt %. Higher amounts of antimony trioxide and optionally a laser-marking synergist in the masterbatch allow less amounts of masterbatch to be employed in order to reach the desired total amount of antimony trioxide and optionally a laser-marking synergist in the laser-markable polyamide composition. To choose a suitable concentration in the masterbatch the person skilled in the art will principally be guided by the desired amount of the laser-marking additive in the laser-markable polyamide composition.

A preferred embodiment is a process comprising a third step. This process comprises the following steps:
a1) blending $Sb_2O_3$ in an amount of between 7.5 to 85 wt % with respect to the total amount of masterbatch and an aliphatic polyamide with an amide density AD1 at a temperature above the melting temperature of the aliphatic polyamide with an amide density AD1 into a masterbatch,
a2) blending the masterbatch obtained in step a1) with an aliphatic polyamide with an amide density AD2 and having a melting temperature $T_mA$ at a blending temperature above the melting temperature of the polyamide with an amide density AD1;
b) producing a laser-markable polyamide composition by blending the obtained blend after step a2) in an aliphatic polyamide with a melting temperature $T_mB$ at a temperature above $T_mB$ and below the melting temperature of the polyamide with an amide density AD1, and a halogen-free flame retardant and optionally other ingredient such as fillers, mold release agents, branching agents, lubricants, pigments,
wherein AD1-AD2 is at least 0.01 and wherein the absolute difference between $T_mA$ and $T_mB$ is less than 50° C., and wherein the amount of Sb$_2$O$_3$ is between 0.1 and 5 wt %, based on the total amount of laser-markable polyamide composition.

This process is particularly suitable for flame retardant laser-markable polyamide compositions in which the flame retardant comprises melamine cyanurate and in which melamine cyanurate is added during step b). In this process having at least three steps, step b) can be carried out at a lower temperature than step a2) which allows for less degradation of melamine cyanurate and thus better flame retardant properties of the laser-markable polyamide composition. Most preferred is a process in which at step b) a flame-retardant being melamine cyanurate in an amount of between 4 to 25 wt % with respect to the total amount of composition is added.

Preferably, the absolute difference between T$_m$A and T$_m$B is less than 20° C., more preferably, the absolute difference is less than 10° C. Most preferred is the embodiment in which the polyamide used in step a2) and b) are the same. When in step a1) and/or a2) blends of polyamides are employed, AD1 and AD2 is based on the majority component of the blend. In case a blend is used the melting temperature T$_m$A and T$_m$B are defined as the melting temperature of the majority component of the blend.

The melting temperature of a polyamide can be determined by DSC measurement, according to ISO 11357-1: 1997 under nitrogen atmosphere (purge 50 ml/min) using a heating and cooling rate of 20 K/min.

The amount of polyamide used in step a2) is preferably higher than the amount used in step a1). Preferably, the ratio between the amount of polyamide used in step a2) versus the amount of polyamide used in step a1) is at least 1:1.1, more preferably at least 1:2.5. A higher amount of polyamide used in step a2) as compared to step a1) ensures that the continuous phase is the polyamide of step a2) which is beneficial for dispersing the laser-marking masterbatch in step b.

Optionally, a laser-marking synergist for the antimony trioxide is added. Preferably the synergist is added during step a1) in the process comprising at least three steps or in step a) for the process comprising two steps.

In another preferred embodiment the process comprises the following steps:
a1) blending Sb$_2$O$_3$ in an amount of between 7.5 to 85 wt % with respect to the total amount of masterbatch and polyamide 46 at a temperature above 295° C. into a masterbatch,
a2) blending the masterbatch obtained in step a1) with polyamide 6 or polyamide 66 at a temperature above 295° C.;
b) producing a laser-markable polyamide composition by blending the obtained blend after step a2) in polyamide 6 or polyamide 66 at a temperature above the melting temperature of polyamide 6 or polyamide 66 respectively and below 295° C., with melamine cyanurate as a flame retardant in an amount of between 4 to 25 wt % with respect to the total amount of composition and optionally other ingredient such as fillers, further flame retardants, mold release agents, branching agents, lubricants, pigments,
and wherein the amount of Sb$_2$O$_3$ is between 0.1 and 5 wt %, based on the total amount of laser-markable polyamide composition.

In another preferred embodiment, in step a1) polyamide 46 is employed and in step a2) and b) polyamide 6 is employed.

Preferably, the masterbatch as obtained after step a) and step a1) is free of polyolefins, as polyolefins are known to adversely affect the flame-retardancy. Preferably, the blend of masterbatch and polyamide as obtained after step a2) is also free of polyolefins, for the same reason.

In the present invention the masterbatch comprises 7.5 to 85 wt % of antimony trioxide and optionally a laser-marking synergist with respect to the total amount of masterbatch. Preferably, the amount is between 5 to 80 wt %, and more preferably between 50 and 80 wt %. Higher amounts of antimony trioxide and optionally a laser-marking synergist in the masterbatch allow less amounts of masterbatch to be employed in order to reach the desired total amount of antimony trioxide and optionally a laser-marking synergist in the laser-markable polyamide composition. To choose a suitable concentration in the masterbatch the person skilled in the art will principally be guided by the desired amount of the laser-marking additive in the laser-markable polyamide composition, as described above.

The invention also relates to a composition obtainable as an intermediate during the process as described above. The composition comprises a halogen-free flame retardant, and Sb$_2$O$_3$ in an amount of between 7.5 and 85 wt % with respect to the total amount of masterbatch and at least two aliphatic polyamides having different amide densities, in which the difference in amide density is at least 0.01 and in which the ratio between the amount of aliphatic polyamide having the highest amide density versus the amount of aliphatic polyamide having the lowest amide density is at least 1:2.5. Preferably, the halogen-free flame retardant is present in the composition in an amount of between 1 and 25 wt % with respect to the total amount of composition.

Preferably, the composition comprises a laser-marking synergist as described above, as this enhances the laser-marking performance.

Preferably, the composition is free of polyolefins, as this is beneficial for the flame retardancy.

EXAMPLES

All materials were compounded on a 25 mm co-rotating twin screw extruder (Berstorff ZE25UTX). The laser-marking additive and flame retardant were added downstream and the other ingredients were added to the throat of the extruder. Various custom made masterbatches were used as described in the ingredients section below and in table 2. The final compositions with laser-marking additives present were molded into various shapes for property testing:
80×80×1 mm plaques for laser-marking evaluation and glow-wire testing.
80×80×4 mm plaques for CTI testing
0.75 mm UL94V specimen for the vertical burning test
GWFI tests were conducted in accordance with IEC60695-2-12. CTI testing was done in accordance with IEC 60112 (with solution A) and vertical burning tests were conducted in accordance to UL 94V.

Laser-marking result was judged manually by laser-marking injection molded plates with dimensions 80×80×1 mm at various intensities and marking speeds. Laser-marking evaluations were performed with a diode-pumped Trumpf VMc5 laser system. So-called evaluation matrices were marked. In such matrices, the marking speed (v [mm/sec]) and frequency (f [kHz]) are varied at given power (p [%]), focal distance (z=0 [in focus] or 6 mm above the sample) and line spacing. The evaluation matrices indicate which contrast can be obtained at certain marking speed with varying laser parameters. An evaluation of the laser-marking performance with respect to contrast and marking speed in terms ranging from excellent (+++) to poor (−) is given in Table 3.

Ingredients:

PA6: Akulon K122 from DSM, aliphatic polyamide with an amide density of 0.20, melting temperature $T_m$=220° C.

PA46: Stanyl KS200 from DSM, aliphatic polyamide with an amide density of 0.25, melting temperature $T_m$ 295° C.

Glass fiber: 173X-11p from 3B fiberglass

Flame retardant: melamine cyanurate MC50 from BASF

Mold release: Calcium-stearate from Faci

Stabilizer: Irganox 1098 from Ciba specialty chemicals

Laser-marking-synergist: Laserflair (LF) LS820 from Merck

Laser-marking-synergist: Stanostat (ST) CP5C from Keeling and Walker

GR261715 $Sb_2O_3$ (80 wt %) in PA6 (20 wt %): Antiox from Campine NV

GR5538 $Sb_2O_3$ (80 wt %) in PA46 (20 wt %): custom made from Campine NV

GR5537 $Sb_2O_3$/stanostat CP5C (76/4 wt %) in PA46 (20 wt %): custom made from Campine NV GR5535 $Sb_2O_3$/stanostat CP5C (76/4 wt %) in PA6 (20 wt %): custom made from Campine NV

TABLE 2 ingredients masterbatch in wt % with respect to the total amount of masterbatch

| | Ingredients | MB1 | MB2 | MB3 |
|---|---|---|---|---|
| GR261715 | $Sb_2O_3$/PA6 | 62.5 | | |
| GR5537 | $Sb_2O_3$/stanostat CP5C in PA46 | | | 62.5 |
| GR5538 | $Sb_2O_3$/PA46 | | 62.5 | |
| K122 | PA6 | 25 | 37.5 | 37.5 |
| KS200 | PA46 | 12.5 | | |
| AD1 | | 0.20 | 0.25 | 0.25 |
| AD2 | | 0.20 | 0.20 | 0.20 |
| T [° C.]* | | 312 | 315 | 317 |

*Step a1) and a2) were carried out at the temperature given in Table 2, last row.

Comparative A

Comparative A consists of a laser-marking additive of $Sb_2O_3$ and Laserflair LS820 as synergist. The only polyamide present in the composition is PA6, therefore only one phase exists. The composition was prepared in one step at a temperature as denoted in Table 3. It is clearly seen that laser-marking performance is sufficient but the composition suffers from low CTI value.

Comparative B

In the composition of Comparative B a lower amount of laser-marking additive is used in combination with an alternative synergist. The only polyamide present in the composition is PA6, therefore only one phase exists and the composition was prepared in one step at a temperature denoted in Table 3. This results in better CTI value as compared to comparative example A, but the laser-marking contrast is poor.

Comparative C

In comparative C a lower amount of $Sb_2O_3$ is used and no synergist is present. The custom made laser-marking masterbatch was prepared by a first step of mixing $Sb_2O_3$ and polyamide 6 at a temperature above 220° C. This masterbatch, GR261715, was subsequently added to a blend of polyamide 6 and polyamide 46, for which the majority is polyamide 6. AD1-AD2 is here thus less than 0.01, namely 0.0. The sample has good CTI but also low laser-marking contrast.

Example 1

Example 1 uses as laser-marking additive $Sb_2O_3$ and Laserflair LS820 as synergist at identical concentrations as Comparative Example A. In Example 1 MB2 was used. Antimony trioxide was added to PA46 at a temperature above the melting temperature of PA46, subsequently, this masterbatch was blended with PA6 at the temperature

TABLE 3

Laser-markable polyamide compositions and results

| Ingredients in wt % | Comparative A | Comparative B | Comparative C | Ex 1 | Ex 2 | Ex 3 | Ex 4 |
|---|---|---|---|---|---|---|---|
| K122 | 63.6 | 66.725 | 65.6 | 61.2 | 65.6 | 64.6 | 65.6 |
| Melamine Cyanurate | 11 | 11 | 11 | 11 | 11 | 11 | 11 |
| glass fiber | 20 | 20 | 20 | 20 | 20 | 20 | 20 |
| Calcium-stearate | 0.3 | 0.3 | 0.3 | 0.3 | 0.3 | 0.3 | 0.3 |
| Irganox 1098 | 0.1 | 0.1 | 0.1 | 0.1 | 0.1 | 0.1 | 0.1 |
| Antiox GR261715 | 4 | | | | | | |
| laserflair LS820 | 1 | | | 1 | | 1 | |
| GR5535 (PA6 based) | | 1.875 | | | | | |
| MB1 | | | 3 | | | | |
| MB2 | | | | 6.4 | | 3 | 3 |
| MB3 | | | | | 3 | | |
| T [° C.]* | 289 | 292 | 290 | 289 | 292 | 290 | 291 |
| Amount of $Sb_2O_3$ [wt %] | 3.2 | 1.425 | 1.5 | 3.2 | 1.425 | 1.5 | 1.5 |
| Amount of Synergist [wt %] | 1.0 LF | 0.075 ST | 0 | 1.0 LF | 0.075 ST | 1.0 LF | 0 |
| CTI | 400 (350) | 600 | 600 (525) | 400 (350) | 600 | 425 (375) | 600 |
| marking result | ++ | +− | +− | +++ | ++ | ++ | ++ |
| GWFI @ 1 mm | 960 | 960 | 960 | 960 | 960 | 960 | 960 |
| UL 94V @ 0.75 mm | V2 | V2 | V2 | V2 | V2 | V2 | V2 |

*this is the temperature at which the laser-markable composition was prepared by blending all components as listed in Table 3.

denoted in Table 2 to give MB2. The components as denoted in Table 3 were blended at a temperature given in Table 3 to yield a laser-markable polyamide composition. This results in sufficient CTI value (comparable to comparative A) but in better laser-marking contrast, as compared to Comparative Example A.

Example 2

Example 2 a lower amount of laser-marking additive is used in combination with an alternative synergist, as compared to Example 1. Moreover, the synergist is added in a first step. Antimony trioxide and stanostad were added to PA46 at a temperature above the melting temperature of PA46, subsequently, this masterbatch was blended with PA6 at the temperature denoted in Table 2 to give MB3. The components as denoted in Table 3 were blended at a temperature given in Table 3 to yield a laser-markable polyamide composition. This results in the similar CTI performance as comparative B but in better laser-marking contrast, as compared to comparative example B.

Example 3

Example 3 uses a lower concentration $Sb_2O_3$ than comparative A. The same synergist is used as in comparative A. Antimony trioxide was added to PA46 at a temperature above the melting temperature of PA46, subsequently, this masterbatch was blended with PA6 at the temperature denoted in Table 2 to give MB2. The components as denoted in Table 3 were blended at a temperature given in Table 3 to yield a laser-markable polyamide composition. The result is an improved CTI performance as compared to comparative A, and also better laser-marking contrast.

Example 4

Example 4 uses the same laser-marking additive package as in comparative C. In contrast to comparative C the masterbatch was based on a PA46 to which subsequently PA6 was added in order to obtain the masterbatch: Antimony trioxide was added to PA46 at a temperature above the melting temperature of PA46, subsequently, this masterbatch was blended with PA6 at the temperature denoted in Table 2 to give MB2. The components as denoted in Table 3 were blended at a temperature given in Table 3 to yield a laser-markable polyamide composition. Compared to comparative C this results in a better CTI value and improved laser-marking performance.

The results in the table 3 clearly show that a polyamide composition according to the invention shows higher laser-marking result, or similar laser-marking result when the amount of antimony trioxide is reduced. This can be concluded when Comparative example A is compared to Example 1. Example 1 shows better laser-marking compared to a composition based on only PA6.

Surprisingly, the CTI value is improved by employing the polyamide composition according to the invention, as well as the process according to the invention. This is seen when comparative example A is compared to examples 2, 3, and 4. In Examples 2, 3, and 4 a significant lower amount of antimony trioxide is employed, while the laser-marking result remains the same. All the CTI values have improved for examples 2, 3 and 4 compared to comparative example A.

The invention claimed is:

1. A laser-marked product formed from a laser-markable polyamide composition, wherein the laser-markable polyamide composition comprises:
   (a) a first polyamide phase comprising an aliphatic polyamide with an amide density AD1 and between 0.1 and 5 wt. %, based on total weight of the polyamide composition, of $Sb_2O_3$,
   (b) a second polyamide phase comprising an aliphatic polyamide with an amide density AD2, and
   (c) between 1 to 25 wt. %, based on total weight of the polyamide composition, of a halogen-free flame retardant, wherein
   each of the amide densities AD1 and AD2 is a ratio of the number of CONH groups per $CH_2$ groups in the polymer repeat units of the aliphatic polyamides of the first and second polyamide phases, respectively, and wherein
   a difference between the amide densities AD1 and AD2 (AD1-AD2) is at least 0.01.

2. The laser-marked product according to claim 1 wherein AD1-AD2 is at least 0.02.

3. The laser-marked product according to claim 1, wherein the aliphatic polyamide in the first phase is polyamide-46 and the aliphatic polyamide in the second phase is chosen from the group of polyamide-6 or polyamide-66 or blends thereof.

4. The laser-marked product according to claim 1, wherein the laser-markable composition further comprises a laser-marking synergist.

5. The laser-marked product according to claim 4, wherein the laser-marking synergist is a Sn containing metal compound.

6. The laser-marked product according to claim 1, wherein the flame retardant is a triazine based flame retardant.

7. The laser-marked product according to claim 1, wherein the laser markable composition comprises a weight ratio of the aliphatic polyamide having the amide density AD1 to the aliphatic polyamide having the amide density AD2 of at least 1:2.5.

8. The laser-marked product according to claim 7, wherein the laser-markable composition further comprises a laser-marking synergist.

9. The laser-marked product according to claim 7, wherein the laser-markable composition is free of polyolefins.

10. The laser-marked product according to claim 8, wherein the laser-markable composition comprises between 0.025 and 0.5 wt % of the laser-marking synergist.

11. The laser-marked product according to claim 4, wherein the laser-markable composition comprises between 0.025 and 0.5 wt % of the laser-marking synergist.

12. The laser-marked product according to claim 8, wherein AD1-AD2 is at least 0.02 and at most 0.1.

* * * * *